April 20, 1965     F. A. TALBOT     3,178,953

VARIABLE SPEED TRANSMISSION

Filed Sept. 26, 1961     2 Sheets-Sheet 1

INVENTOR
FRANK A. TALBOT

BY

ATTORNEY

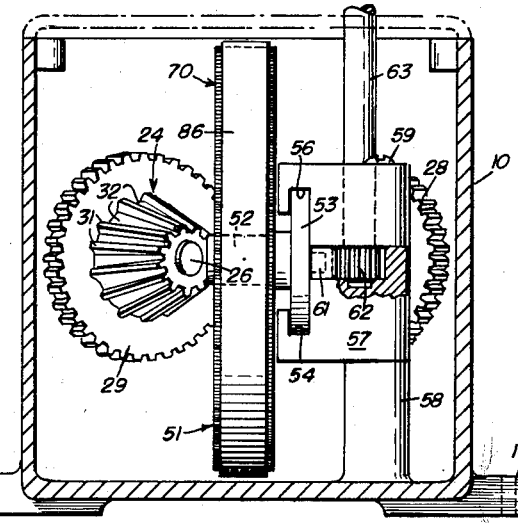

United States Patent Office 3,178,953
Patented Apr. 20, 1965

3,178,953
VARIABLE SPEED TRANSMISSION
Frank A. Talbot, B22 Abbott Court, High St.,
Fair Lawn, N.J.
Filed Sept. 26, 1961, Ser. No. 140,719
2 Claims. (Cl. 74—325)

The present invention relates to a variable speed drive for the transmission of power therethrough wherein the energy is transferred from the input shaft to the output shaft by interengaging gear teeth and without depending on friction and the invention pertains to such a gear mechanism providing an infinitely variable speed changing device.

An object of the invention is to provide a variable speed drive wherein the torque applied to the input shaft is transferred to the output shaft by a rotatable wheel which carries laminations or slats on its periphery which may move laterally with respect to the plane of rotation of the wheel so as to mesh with teeth of two pairs of frusto-conical shaped gears to provide a positive drive and with the wheel carrying the laminations being shiftable to change the speed ratio between the input and output shafts.

A more specific object of the invention is to provide two generally conical shaped gears arranged side-by-side and with their peripheries in parallel relationship with the elongated generally longitudinally extending gear teeth thereon meshing with laminations or slats carried by a wheel which rotates in a plane between the parallel peripheries of the gears and with two generally conical shaped gears arranged side-by-side and with their peripheries in parallel relationship and with the elongated generally longitudinally extending gear teeth thereon meshing with the slats or laminations of a diametrically opposite portion of the wheel so that shifting of the wheel in its plane of rotation provides for changes in the ratio of the gear assembly.

Other objects and features of the invention will be appreciated and become more apparent to those skilled in the art to which the present invention pertains and as the present disclosure proceeds and upon consideration of the accompanying drawings taken with the following detailed description wherein an embodiment of the invention is disclosed.

In the drawings:

FIG. 4 is a transverse sectional view taken on the line 4—4 of FIG. 2.

FIG. 5 is a side elevational view of the wheel carrying the laminations or slats with some omitted to illustrate the structure of the wheel.

FIG. 6 is an exploded fragmentary sectional view taken on the line 6—6 of FIG. 5 and showing one type of lamination or slat in relation to the wheel.

FIG. 7 is a similar fragmentary sectional view taken on the line 7—7 and showing another type of lamination or slat in association with the wheel.

FIG. 8 is a fragmentary sectional view taken on the line 8—8 of FIG. 5.

FIG. 9 is an enlarged end view of one of the laminations or slats showing the tapering of the side faces thereof.

FIG. 10 is a section taken substantially on the line 10—10 of FIG. 2 and illustrating the manner in which the laminations or slats mesh with the teeth of one pair of generally conical shaped gears.

Figure 1:
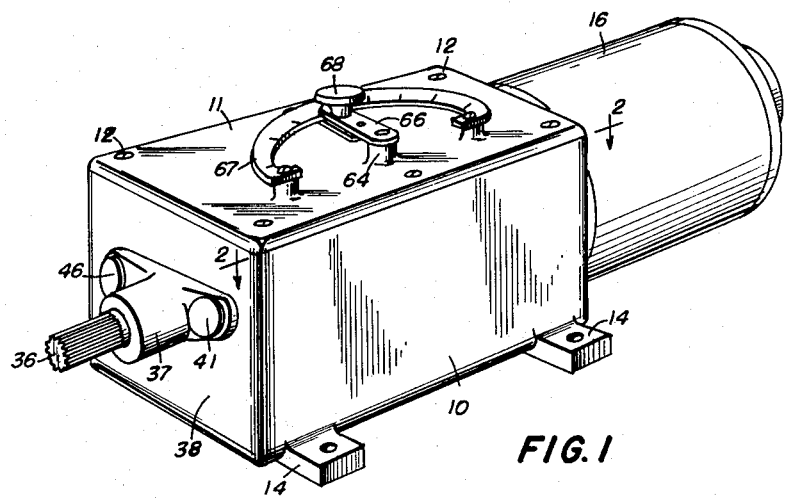
FIG. 1 is a perspective view of a variable speed gear mechanism embodying the invention.

The present invention is directed to a gear mechanism wherein power is transferred from an input shaft to two generally conical shaped gears which are caused to rotate in opposite directions and with peripheral portions thereof arranged in parallel spaced relationship. A wheel is mounted to rotate in a plane between the two generally conical shaped gears with the wheel carrying laminations or slats at the periphery thereof which may shift laterally of the wheel while it rotates about its axis to mesh with teeth carried by the conical shaped gears. A similar arrangement of two generally conical shaped gears at a diametrically opposite portion of the wheel provides for meshing of the laminations or slats with the teeth on the second set of gears to provide a positive gear drive. The second set of gears drive an output shaft. The wheel carrying the laminations or slats is mounted for movement towards the smaller diameter ends of one set of conical gears and towards the larger diameter ends of the other set of conical gears to provide for changes in the effective diameter of the gears and to provide a variable speed drive.

An embodiment of such a gear mechanism is illustrated in the drawings which may be enclosed within a housing 10 which is adapted to be closed by a detachable cover plate 11 secured in place by any suitable means such as cap screws 12. The housing may be provided with lugs 14 for anchoring the gear box to a suitable base. The housing with the cover plate 11 in place provides a closed casing so that a lubricant for the gear mechanism may be maintained in operative relationship with the relative movable elements.

Figure 2:
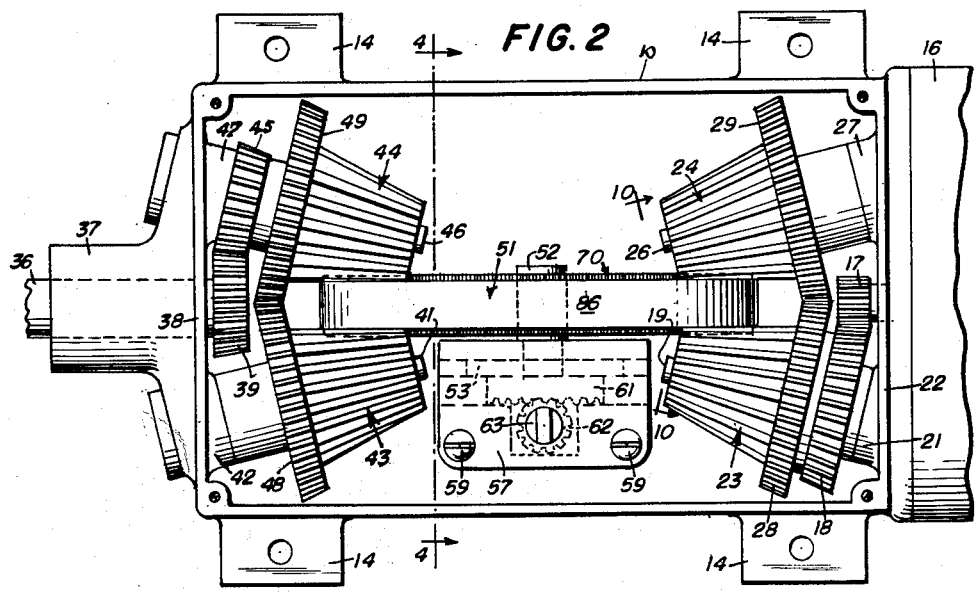
FIG. 2 is a plan view with the cover plate omitted.
Figure 3:
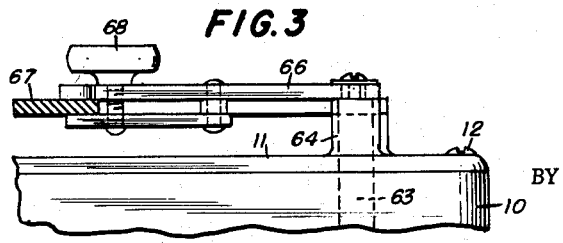
FIG. 3 is a fragmentary end elevational view showing the manual actuated element for altering the speed ratio.

An electric motor 16 may be provided as a power source and the motor may be mounted on an end wall of the housing 10 as shown in FIGS. 1 and 2. The shaft of the motor 16 extends through the end wall 22 and carries a pinion 17 at the free end which is within the gear box. The pinion 17 meshes with a gear wheel 18 mounted for rotation about an angularly disposed shaft 19. The shaft 19 is supported in a bracket 21 carried by the end wall 22 of the housing. A frusto-conical shaped gear 23 is mounted for rotation about the axis of the shaft 19. A similar frusto-conical shaped gear 24 is mounted to rotate about the axis of an angularly disposed shaft 26. The shaft 26 is mounted in a bracket 27 carried by the end wall 22 of the gear box. A gear 28 connected to the frusto-conical shaped gear 23 has its teeth in mesh with a similar gear 29 which is carried by or secured to the frusto-conical gear 24. The gear 18 is connected to or formed integral with the gear 28 so that rotation of the pinion 17 causes the two frusto-conical gears 23 and 24 to rotate in opposite directions as indicated in FIG. 10.

The frusto-conical gears 23 and 24 are each provided with longitudinally extending gear teeth 31 which increase in width measured circumferentially of the gear in proceeding from the smaller diameter end to the larger diameter portion. A groove 32 is provided between each pair of teeth 31 and these grooves increase in width measured circumferentially of the respective gear in proceeding from the smaller diameter end to the larger diameter end. The confronting peripheral portion of the gears 23 and 24 are in parallel relationship as best shown in FIG. 2. The meshing of the teeth of the gears 28 and 29 maintain one gear tooth 31 of one conical gear opposite a groove 32 of the other frusto-conical gear and this relationship is shown in FIG. 10.

An output shaft 36 is journalled for rotation in a bearing 37 of any suitable type carried by the end wall 38 of the gear box or housing 10. The output shaft 36 is desirably in axial alignment with the input shaft. A small pinion 39 is secured to the output shaft 36 on the inboard side of the end wall 38. An angularly disposed shaft 41 is supported by a bracket 42 carried by the end wall 38. A frusto-conical shaped gear 43 is mounted for rotation on the shaft 41. The gear 43 is similar in shape and construction to the gear 23. Another frusto-conical shaped gear 44 is mounted for rotation about an angularly disposed shaft 46 supported in a bracket 47 carried by the end wall 38.

A gear 48 formed integral with the gear 43 or secured thereto has its teeth in mesh with a gear 49 formed integral with or secured to the gear 44. A gear 45 connected to or integral with the gear 49 meshes with the gear 39. The teeth of the gears 48 and 49 are in mesh in such relationship as to maintain an elongated gear tooth of the gear 43 in confronting relationship with a groove 32 in the other frusto-conical gear 44. It will be observed from a consideration of FIG. 2 that the peripheral portions of the frusto-conical gears 43 and 44 are in parallel spaced relationship similar to that described in connection with the gears 23 and 24.

A feature of the gear mechanism pertains to the transmission of power from the input gear members 23 and 24 to the output gear members 43 and 44. A wheel 51 is provided for this purpose which is journalled for rotation about a stub shaft 52. A roller bearing assembly 50 is desirably provided facilitating rotation of the wheel 51 about the axis of the shaft 52. The shaft 52 carries an enlargement or a disc-shaped element 53 at the end remote of the wheel 51 which is accommodated in grooves 54 and 56 formed in block elements 57. These block elements are supported by upstanding bosses 58 which may be formed integral with the bottom wall of the housing 10. The block elements 57 may be secured in place and mounted on the bosses 58 by means of cap screws 59. A rack gear 61 is attached to the element 53. A pinion gear 62 mounted at the lower end of a control shaft 63 meshes with the teeth of the rack gear 61.

The control shaft 63 extends through the cover plate 11 and the upper end is journalled for rotation in a bearing 64. A lever arm 66 is detachably secured to the upper end of the shaft 63. The lever arm 66 serves to rotate the shaft 63 and the pinion 62 to shift the rack gear 61 and the shaft 52 longitudinally of the housing so as to move the wheel 51 in its plane of rotation which is between the gears 23 and 24 and between the gears 43 and 44. The lever arm 66 may serve as an index in relation to a scale carried by an arcuate plate 67 supported in spaced relationship with respect to the outer face of the cover plate 11. A clamping mechanism may be provided at the free end of the lever arm 66 for gripping the plate 67 by manipulation of a knob 68 to maintain the shaft 63 in position after rotation thereof to adjust the position of the wheel 51 in relation to the input and output gear members.

The wheel 51 is of such diameter that one peripheral portion or segment extends between the frusto-conical gears 23 and 24 while a diametrically opposite peripheral portion or segment occupies a position between the frusto-conical gears 43 and 44. A plurality of projections 71 are provided on the periphery of the wheel 51 in circumferentially spaced relationship as best shown in FIG. 5. A recess 72 is provided between each two adjacent projections 71.

A plurality of laminations or slats are mounted on the periphery of the wheel 51. These laminations are of two types and one type is shown at 73 in FIG. 6. It has a width greater than that of the wheel 51 and has a notch 74 in the inner edge for spanning the rim 76 at the periphery of the wheel 51. The laminations 73 are arranged transversely of the wheel 51 and occupy the recess areas 72. Another type of laminations 77 is shown in FIG. 7. It has a width equal to that of the laminations 73 but the notch 78 is of greater depth so as to lie along the outer face 79 of the projections 71. The laminations 77 are arranged throughout the circumferentially extending dimension of each projection 71. All of the laminations have tapered side faces as indicated at 81 and 82 in FIG. 9.

The legs 83 on both types of laminations or slats permit lateral movements with respect to the wheel 51. The laminations or slats are held in operative assembled relationship about the entire periphery of the wheel by a circular band 86 which has a width substantially equal to that of the wheel 51. The width of the laminations or slats is greater than the band 86 as will be apparent from a consideration of FIG. 8. The laminations or slats of both types are indicated generally at 70 in FIGS. 2, 4, 5 and 10.

In operation and when the output shaft of the motor drives the pinion 17 in one direction of rotation the gears 23 and 24 rotate in opposite directions as indicated by the arrows in FIG. 10. The laminations or slats 70 are pushed laterally of the wheel 51 by one or more of the gear teeth 31 into a groove or grooves 32 of the other frusto-conical gear. Thus there is a meshing of teeth in the engagement of the gears 23 and 24 with the laminations or slats at one peripheral portion of the wheel 51. The laminations or slats 70 at a diametrical opposite peripheral portion of the wheel 51 mesh with the gear teeth 31 of the gears 43 and 44 as a consequence of lateral shifting of the slats or laminations at this portion of the wheel 51. The gears 43 and 44 are rotated in opposite directions and the gear 45 drives the pinion 39 and the output shaft 36.

The wheel 51 is shown in an intermediate position and when the shaft 63 is rotated in a clockwise direction in FIG. 2 by swinging the lever arm 66 to the right the larger diameter portions of the teeth 31 on the gears 23 and 24 mesh with the laminations or slats 70. The laminations or slats 70 then mesh with the smaller diameter portions of the teeth 31 on the gears 43 and 44. The output shaft then rotates at a higher rate of speed than the input shaft. The wheel 51 may be shifted to the left beyond the position shown in FIG. 2 so that the effective diameter of the zones of engagement of the frusto-conical gears is then such that the output shaft rotates at a lower rate of speed than the input shaft. Any infinite number of speed ratios may be made by adjusting the position of the axis of the wheel 51 longitudinally of the housing to alter the zones of engagement with the input and output gear members.

While the invention has been described with reference to structural details and with regard to a general organization of gears it will be appreciated that changes may be made in the elements as well as the overall assembly. Such modifications and others may be made without departing from the spirit and scope of the invention as set forth in the appended claims.

What I claim and desire to secure by Letters Patent is:

1. In a variable speed gear mechanism, a housing having end walls and a bottom wall, a detachable cover plate closing said housing, a stub shaft, a wheel mounted for rotation on said stub shaft, means extending from said bottom wall supporting said stub shaft, lamination arranged throughout a peripheral portion of said wheel individually movable transversely of the plane of said wheel, a pair of substantially frusto-conical shaped gears arranged with small diameter portions spanning said laminations at one segment of said wheel, means carried by one of said end walls supporting said gears for rotation about fixed axes with confronting peripheral portions in substantially parallel spaced relationship, means maintaining synchronous rotation of said gears, a second pair of substantially frusto-conical shaped gears arranged with small diameter end portions spanning said laminations at a diametrically opposite segment of said wheel, means carried by the other end wall supporting said second pair of gears for rotation about fixed axes with confronting peripheral portions of said second pair of gears in substantially parallel spaced relationship, means maintaining synchronous rotation of said second pair of gears, elongated longitudinally extending teeth on said gears meshing with said laminations, and means for bodily shifting said stub shaft in directions substantially aligned with the axes of said gears.

2. In a variable speed gear mechanism, a housing having end walls and a bottom wall, a detachable cover plate closing said housing, upstanding bosses carried by said bottom wall, block elements supported by said bosses, a stub shaft, a wheel mounted for rotation on said stub shaft, laminations arranged throughout a peripheral portion of said wheel individually movable transversely of the plane of said wheel, a pair of substantially frusto-conical shaped gears arranged with small diameter portions spanning said laminations at one segment of said wheel, means carried by one of said end walls supporting said gears for rotation about fixed axes with confronting peripheral portions in substantially parallel spaced relationship, means maintaining synchronous rotation of said gears, a second pair of substantially frusto-conical shaped gears arranged with small diameter end portions spanning said laminations at a diametrically opposite segment of said wheel, means carried by the other end wall supporting said second pair of gears for rotation about fixed axes with confronting peripheral portions of said second pair of gears in substantially parallel spaced relationship, means maintaining synchronous rotation of said second pair of gears, elongated longitudinally extending teeth on said gears meshing with said laminations, said block elements having a groove therein substantially parallel to the plane of said wheel and substantially perpendicular to the plane formed by the axes of said gears, and means carried by said stub shaft slidable in said groove.

References Cited by the Examiner
FOREIGN PATENTS 504,304   7/51   Belgium.

DON A. WAITE, *Primary Examiner*.